(12) United States Patent
Van De Witte et al.

(10) Patent No.: US 6,628,354 B2
(45) Date of Patent: Sep. 30, 2003

(54) DISPLAY DEVICE

(75) Inventors: Peter Van De Witte, Eindhoven (NL); Sjoerd Stallinga, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/192,265

(22) Filed: Jul. 10, 2002

(65) Prior Publication Data
US 2002/0191129 A1 Dec. 19, 2002

Related U.S. Application Data

(63) Continuation of application No. 09/541,764, filed on Apr. 3, 2000, now Pat. No. 6,437,843.

(30) Foreign Application Priority Data

Apr. 8, 1999 (EP) .............................................. 99201101

(51) Int. Cl.[7] ............................................ G02F 1/1335

(52) U.S. Cl. ............................ 349/96; 349/76; 349/119
(58) Field of Search .............................. 349/75, 76, 77, 349/78, 81, 117, 118, 119, 120, 96

(56) References Cited

U.S. PATENT DOCUMENTS

| | | | | |
|---|---|---|---|---|
| 5,221,978 A | * | 6/1993 | Heynderickx et al. | 349/76 |
| 5,235,443 A | * | 8/1993 | Barnik et al. | 349/194 |
| 5,287,207 A | | 2/1994 | Mulkens et al. | 359/73 |
| 5,295,009 A | * | 3/1994 | Barnik et al. | 349/115 |
| 5,319,478 A | * | 6/1994 | Funfschilling et al. | 349/181 |
| 5,726,723 A | * | 3/1998 | Wang et al. | 349/75 |
| 6,028,656 A | * | 2/2000 | Buhrer et al. | 349/196 |
| 6,437,843 B1 | * | 8/2002 | Van De Witte et al. | 349/117 |

* cited by examiner

*Primary Examiner*—Toan Ton
*Assistant Examiner*—David Chung
(74) *Attorney, Agent, or Firm*—Aaron Waxler

(57) ABSTRACT

In normally black double cells, the viewing angle (especially for DSTN) is increased by adding a retardation foil, having its optical axis parallel to an optical axis of the analyzer.

5 Claims, 2 Drawing Sheets

DISPLAY DEVICE

This is a continuation of application Ser. No. 09/541,764, filed Apr. 3, 2000 now U.S. Pat. No. 6,437,843.

The invention relates to a liquid crystal display device comprising, between a polarizer and an analyzer, a first layer of twisted liquid crystal material having a twisted structure between two transparent substrates, and a second layer of twisted liquid crystal material having a twisted structure between two transparent substrates, with a twist sense which is opposite to that of the first layer of twisted liquid crystal material and with a substantially identical twist angle.

Such double cells are often used in, for example, automotive displays. The two cells may have, for example, a common substrate of, for example, glass or a synthetic material. The used liquid crystal effect is mostly the (super) twisted nematic effect (S)TN, but also other liquid crystal materials such as discotic materials are applicable.

An example of such a double cell is shown in, for example, U.S. Pat. No. 5,287,207. Notably for S-TN double cells, the second cell usually functions as a color compensator. Although a satisfactory contrast is obtained in the case of perpendicular passage of the light, and also for, for example, orange light in the case of oblique passage, it appears to be difficult to manufacture such a double cell in a simple manner (for example, by adapting the thickness(es) and/or birefringence of the layer(s)) with a satisfactory contrast upon oblique passage of, for example, green light or white light for which there is a great demand in displays for "automotive" applications. The contrast is considerably lower for green light at an angle, while leakage of light through non-addressed pixels occurs.

It is, inter alia, an object of the invention to obviate one or more of the above-mentioned problems. To this end, a liquid crystal display device according to the invention is characterized in that at least one optical retardation foil is present between the analyzer and the polarizer, which retardation foil has an optical principal axis which is substantially parallel to one of the optical axes of the analyzer (transmission or absorption axis).

A retardation foil is understood to be a self-supporting or non-self-supporting layer of a birefringent material, or a layer having an optically compensating or retarding effect (an optically anisotropic layer). Upon birefringence, the refractive index varies in dependence upon the direction of the vector of the electric field associated with a light ray. Birefringent material has only one axis for which a light ray with the vector of the electric field along this axis is diffracted at an extraordinary refractive index $n_e$. The relevant axis is referred to as the optical principal axis of the material. For light rays with the vector of the electric field perpendicular to this axis, the refractive index may be the same for all directions (ordinary refractive index $n_o$). If the refractive index varies perpendicular to this axis, then a bi-axial material is concerned. In this case, one of the axes, preferably the axis having the largest refractive index, is parallel to the (transmission) axis of the analyzer.

Said retardation foil may comprise a plurality of retardation layers which are jointly present in one position (for example, between the double cell and the analyzer), but these (sub-)layers may be alternatively present at separate locations.

It is found that the contrast is considerably enhanced due to said choice of the retardation foil with a principal axis which is substantially parallel to the transmission axis of the analyzer (deviation of at most ±5%), notably when a value R of between 100 and 400 nm is chosen for the retardation of the foil R (or of the joint (sub-)layers). The invention is notably applicable to STN double cells having a positive optical anisotropy ($\Delta n=(n_e-n_o)>0$). The invention is also applicable to double cells in which the second cell (referred to as compensator cell) comprises a twisted liquid crystal material having a negative optical anisotropy, for example, discotic materials. The twist angles are then preferably in a range between 45 and 315 degrees.

These and other aspects of the invention are apparent from and will be elucidated with reference to the embodiments described hereinafter.

In the drawings:

FIG. 2 is a cross-section of another display device according to the invention, while

The drawings are diagrammatic and not drawn to scale. Corresponding parts are generally denoted by the same reference numerals.

Figure 1:
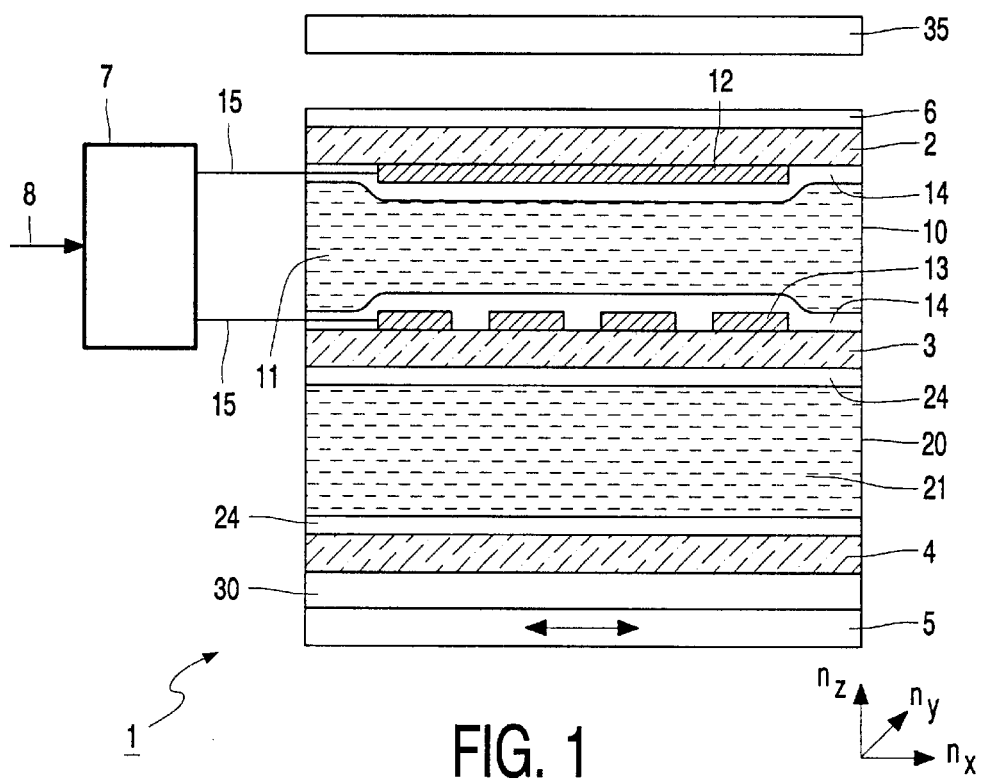
FIG. 1 is a cross-section of a display device according to the invention.

The display device 1 of FIG. 1 comprises a first display cell 10 with a layer 11 of liquid crystal material, having a positive dielectric anisotropy and a positive optical anisotropy, between two transparent supporting plates 2, 3. On the side of the liquid crystal material, the supporting plates 2, 3 are provided with electrodes 12, 13 defining, for example, a matrix of pixels. The pixels may be driven via switching elements and drive electrodes (active drive). In this example, the pixels are defined by overlapping parts of strip-shaped electrodes which are supplied with selection and data signals (passive drive). The drive voltages are obtained, for example, by means of a drive circuit 7 which converts incoming information 8 into said drive voltages which are applied to the electrodes 12, 13 via connection lines 15. Layers 14 of an insulating material serving, in this example, also as orienting layers, are present on the layers 12, 13. The layers 14 give the liquid crystal molecules a twist angle $\Phi_1$ at a voltage of 0 volt across the electrodes 12, 13. The twist angle $\Phi_1$ is between 135° and 360° and is 180° in this example.

The device further comprises a compensating layer, in this example a second cell 20, with a second layer 21 of a liquid crystal material, also having, in this example, a positive optical anisotropy, between two transparent supporting plates 3, 4. The supporting plate 3 is chosen to be common for both cells 10, 20, but this is not strictly necessary; however, this simplifies the manufacture in which also the total thickness of the double cell remains small. Layers 24 for insulation and orientation are present on the supporting plates 3, 4. The liquid crystal material 21 and the orienting effect of the layers 24 are chosen to be such that the liquid crystal molecules acquire a twist angle of $\Phi_2$, opposite to $\Phi_1$. The cells 10 and 20 are present between a polarizer 6 and an analyzer 5, whose directions of polarization are mutually crossed perpendicularly. The wall orientation of the layers 14, 24 is chosen to be such that the director in the center of the cell 10 (at a voltage of 0 volt) is perpendicular to the director in the center of the cell 20.

Such a double cell has an excellent contrast in the case of a perpendicular viewing direction and viewing directions at a small angle with respect to the normal. A further advantage is that the temperature dependence of the cells 10 and 20 is substantially identical so that these double cells can be used through a large temperature range. This is notably important for "automotive" applications (dashboards, etc.).

For viewing directions at a larger angle with respect to the normal, the contrast will be worse due to leakage of light. Notably for green light sources and light sources having a wide color spectrum (for example, white light or combinations of blue and yellow light), this cannot be solved easily by adapting the electro-optical properties of the liquid crystal material, such as the retardation in the compensator cell.

According to the invention, this is largely solved by providing the double cell with an optical retardation foil 30 having its optical principal axis (the slow axis) of the retardation foil substantially parallel to the transmission direction of the analyzer 5. Such a uniaxial retardation foil having a retardation of 232 nm was added to a double cell, in which the composite cells 10 and 20 had a thickness of 5.7 μm each and a birefringence Δn of 0.16. The slow axis was in the plane of the analyzer 5, i.e. horizontally to the plane of the drawing in FIG. 1 (in the direction of the arrow $n_x$; the two other components $n_y$ and $n_z$ are perpendicular to the plane of the drawing and vertical to the plane of the drawing, respectively, in FIG. 1). The components $n_x$, $n_y$ and $n_z$ define the refractive index (and the optical axis of the retardation foil 30). In the relevant case (uniaxial foil or uniaxial retarder) it holds that $n_x > n_y = n_z$. When a green light source 35 (λ=560 nm) was used, the following improvement with respect to the double cell without retardation foil 30 was found. The polar angles (angles with respect to the z direction) at which the contrast had a value of 1:10 as a function of the azimuth angle were measured. The leakage of light was also measured. The polar angles were measured, above which the leakage of light was more than 2% as a function of the azimuth angle. This yielded the following results:

TABLE 1

| Contrast | Azimuth - angle(°) | | | | | | | |
|---|---|---|---|---|---|---|---|---|
| | 0 | 45 | 90 | 135 | 180 | 225 | 270 | 315 |
| Double cell | 43 | 30 | 22 | 33 | 48 | 58 | 51 | 65 |
| Double cell with foil | 49 | 40 | 27 | 40 | 52 | 50 | 58 | 63 |

TABLE 2

| Brightness | Azimuth - angle(°) | | | | | | | |
|---|---|---|---|---|---|---|---|---|
| | 0 | 45 | 90 | 135 | 180 | 225 | 270 | 315 |
| Double cell | 38 | >70 | 26 | >70 | 40 | >70 | 35 | >70 |
| Double cell with foil | 55 | >70 | 38 | >70 | 49 | >70 | 53 | >70 |

It is apparent from the Tables that a considerable improvement of contrast and a reduction of light leakage through a larger range of angles is obtained. For the retardation R, preferably a value $\lambda/4 < R < \lambda/2$ is chosen; in practice, this means that R has a value of between 100 and 400 nm, which is also dependent on the wavelength(s) of the light source 35.

Figure 2:
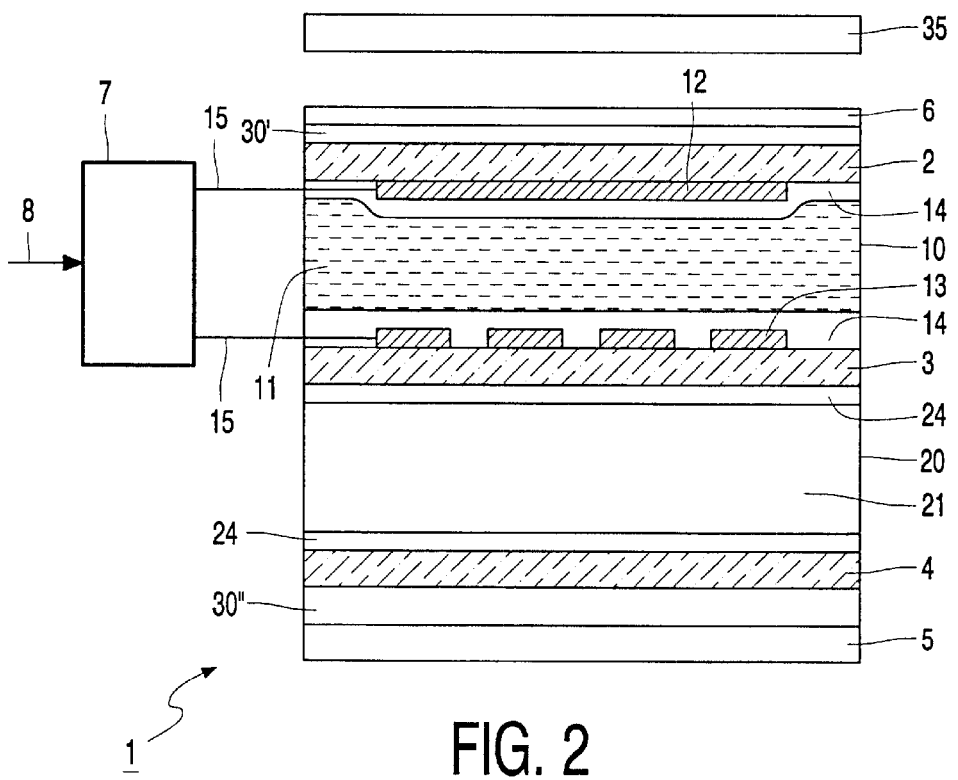
Figure 3:
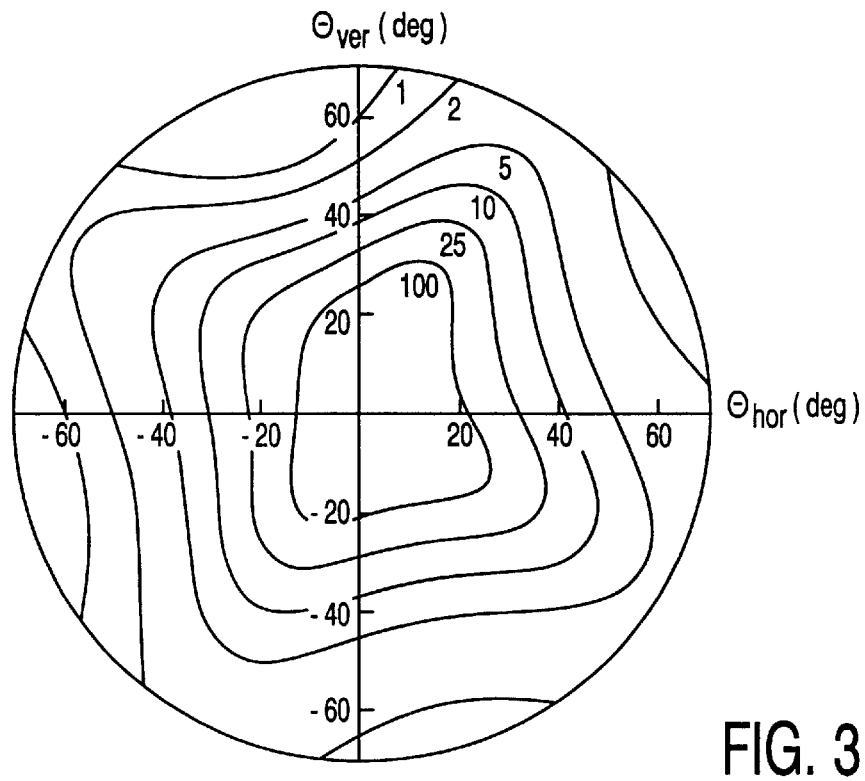
FIGS. 3 and 4 show isocontrast curves for a conventional double cell and for a double cell as shown in FIG. 2, to which the measure according to the invention has been applied.
Figure 4:
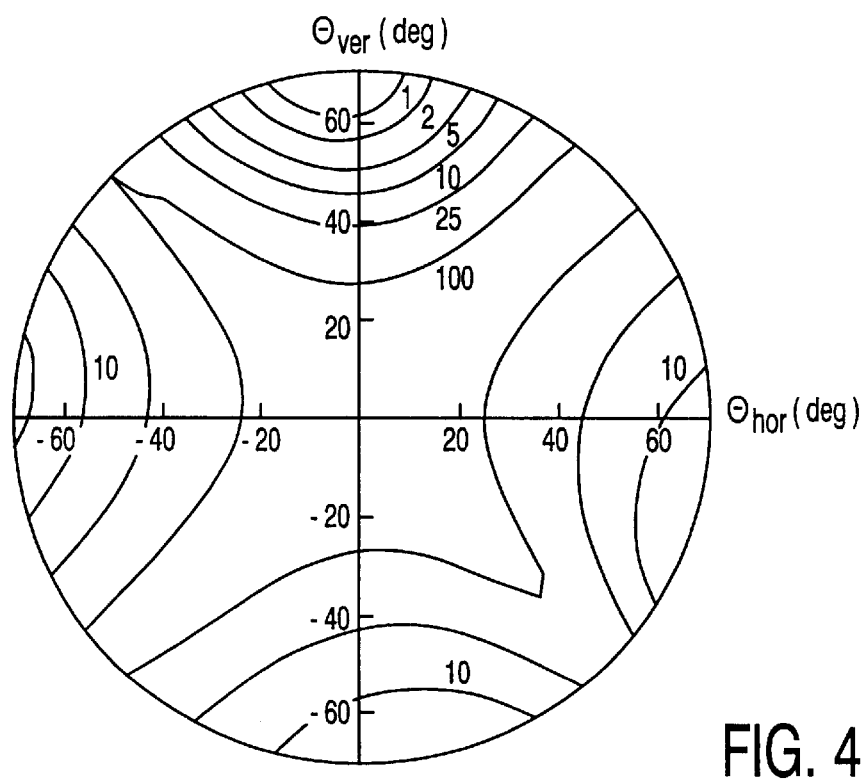

The retardation foil may be composed of a plurality of sub-layers. The sub-layers do not need to be present on the same side; for example, the device of FIG. 2 has two sub-layers 30', 30" which are present near the polarizer and the analyzer, respectively. These sub-layers 30', 30" may be alternatively present on the substrate 3. In the device of FIG. 2, the twist angle $\Phi_1$ of the sub-cell 10 is approximately 90 degrees. In this example, the second cell 20 has a second layer 21 of a liquid crystal material having a negative optical anisotropy. The orienting effect of the layers 24 is chosen to be such that the liquid crystal molecules acquire a twist angle $\Phi_2$, opposite to $\Phi_1$. Such a sub-cell 20 is obtained in this example by choosing a discotic liquid crystalline material for the liquid material. In this example, the layer 21 is liquid but may alternatively comprise a polymerized liquid crystalline material. FIGS. 3 and 4 show the isocontrast curves for a double cell in accordance with the state of the art ($\Phi_1 = \Phi_2 = 90°$, d.Δn=430 nm, twisted nematic material for both sub-cells) and for the double cell of FIG. 2, in which the retardation foil with a retardation of 220 nm is directly placed behind the analyzer with the optical axis parallel to the direction of the analyzer. It is apparent from the Figures that the contrast range, limited by contrast 1:10, now horizontally covers the angles between −55° and +61° (instead of between −38° and +42° in FIG. 3) and vertically the angles between −58° and +45° (instead of between −36° and +38° in FIG. 3). The measure thus yields a considerable improvement of the contrast at oblique angles.

The invention is of course not limited to the examples shown, but many variations are possible. For example, the viewing angle of light sources other than green ones was also improved. For the optical axis of the retardation foil, it is not necessary that $n_x > n_y = n_z$, but $n_x > n_z > n_y$ is also satisfactory. The optical axis of this type of biaxial foil may extend both along the transmission axis and along the absorption axis of the analyzer.

In summary, the invention provides an improvement of the viewing angle in "normally black" double cells in that a retardation foil with its optical principal axis parallel to the analyzer is added.

The invention resides in each and every inventive characteristic feature and each and every combination of characteristic features.

What is claimed is:

1. A liquid crystal display device comprising, between a polarizer and an analyzer, a first layer of twisted liquid crystal material having a twisted structure between two transparent substrates and a second layer of twisted liquid crystal material having a twisted structure between two transparent substrates, with a twist sense which is opposite to that of the first layer of twisted liquid crystal material and with a substantially identical twist angle, characterized in that at least one optical retardation foil is present between the analyzer and the polarizer, which retardation foil has an optical principal axis which is substantially parallel to one of the optical axes of the analyzer, wherein the retardation foil is a self-supporting or non-self-supporting layer of a birefringent material, or a layer having an optically compensating or retarding effect.

2. A liquid crystal display device as claimed in claim 1, characterized in that the retardation foil is uniaxial and that the optical principal axis thereof is substantially parallel to the one optical axis of the analyzer that has the largest refractive index.

3. A liquid crystal display device as claimed in claim 1 or 2, characterized in that the liquid crystal material is nematic and the twist angle is 135°–360°.

4. A liquid crystal display device as claimed in claim 1 or 2, characterized in that the joint retardation of the retardation layers is 100–400 nm.

5. A liquid crystal display device as claimed in claim 1 or 2, characterized in that the display device comprises a light source emitting substantially green light.

* * * * *